United States Patent
Pöyhönen

(10) Patent No.: US 9,531,166 B2
(45) Date of Patent: *Dec. 27, 2016

(54) METHOD AND ARRANGEMENT FOR TRIGGERING A SERIES SPARK GAP

(71) Applicant: ALSTOM Technology Ltd, Baden (CH)

(72) Inventor: Jussi Pöyhönen, Tampere (FI)

(73) Assignee: ALSTOM TECHNOLOGY LTD, Baden (CH)

( * ) Notice: Subject to any disclaimer, the term of this patent is extended or adjusted under 35 U.S.C. 154(b) by 289 days.

This patent is subject to a terminal disclaimer.

(21) Appl. No.: 14/134,891

(22) Filed: Dec. 19, 2013

(65) Prior Publication Data

US 2014/0175995 A1  Jun. 26, 2014

(30) Foreign Application Priority Data

Dec. 21, 2012 (EP) .................................. 12199030

(51) Int. Cl.
| | |
|---|---|
| H02H 7/16 | (2006.01) |
| H01T 15/00 | (2006.01) |
| H02H 9/06 | (2006.01) |
| H01T 4/20 | (2006.01) |
| H01T 2/02 | (2006.01) |

(52) U.S. Cl.
CPC ................ H01T 15/00 (2013.01); H02H 9/06 (2013.01); *H01T 2/02* (2013.01); *H01T 4/20* (2013.01); *H02H 7/16* (2013.01)

(58) Field of Classification Search
CPC ...................................................... H02H 7/16
See application file for complete search history.

(56) References Cited

U.S. PATENT DOCUMENTS

| 3,348,100 A | 10/1967 | Kresge | |
|---|---|---|---|
| 4,029,997 A | 6/1977 | Wittel | |
| 4,625,254 A * | 11/1986 | Fahlen | H02H 9/06 361/16 |
| 5,099,957 A | 3/1992 | Eriksson | |
| 8,102,635 B2 * | 1/2012 | Hallstrom | H01T 2/02 361/117 |
| 2009/0213504 A1 | 8/2009 | Hällström et al. | |

FOREIGN PATENT DOCUMENTS

| DE | 1 056 716 B | 5/1959 |
|---|---|---|
| FI | 902781 A | 12/1991 |
| FI | 88012 B | 12/1992 |
| SE | 8205236 A | 6/1983 |
| WO | WO 2007/003706 A1 | 1/2007 |

* cited by examiner

*Primary Examiner* — Hai L Nguyen
(74) *Attorney, Agent, or Firm* — Morgan, Lewis & Bockius LLP

(57) ABSTRACT

A series spark gap includes at least three partial spark gaps. In a continuous operation mode, a supply voltage acting over the partial spark gaps is divided by a first voltage dividing mechanism. During triggering, more than half of the partial spark gaps are bypassed by using a bypass mechanism such that more than half of the supply voltage acts over the partial spark gaps that are not bypassed, whereby the partial spark gap or the partial spark gaps that are not bypassed ignite. The voltage acting over the bypassed partial spark gaps is divided asymmetrically using the bypass mechanism, whereby the bypassed partial spark gaps ignite sequentially in the order determined by the asymmetric voltage division.

16 Claims, 1 Drawing Sheet

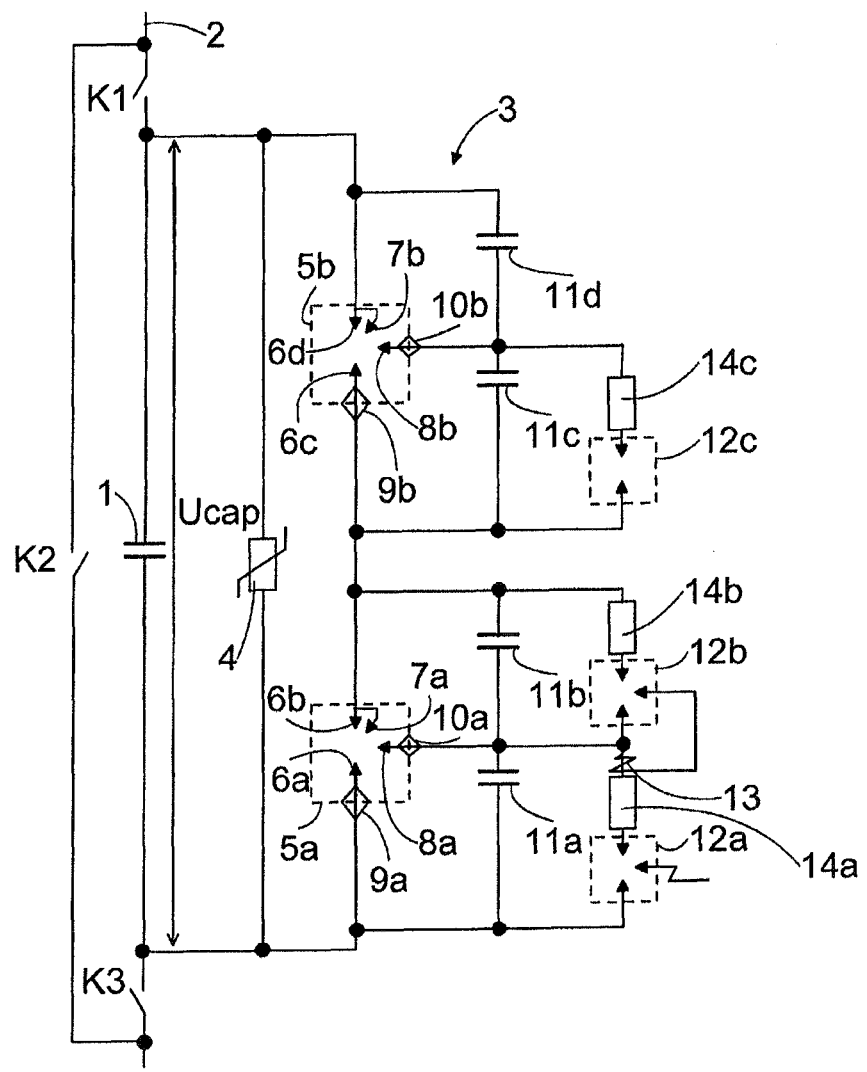

METHOD AND ARRANGEMENT FOR TRIGGERING A SERIES SPARK GAP

FIELD OF THE INVENTION

The invention relates to a method for triggering a series spark gap.

The invention further relates to an arrangement for triggering a series spark gap.

BACKGROUND OF THE INVENTION

In connection with high voltage lines, for instance, there are employed series capacitor banks to compensate for line inductance. In parallel with a capacitor bank, in protection thereof, there is generally coupled a metal oxide varistor and/or a spark gap. Solutions for triggering a spark gap are disclosed in publications SE 8205236, FI 88012 and WO 2007/003706, for example.

BRIEF DESCRIPTION OF THE INVENTION

The object of the present invention is to provide a new solution for triggering a series spark gap.

The invention is characterized by the features of the independent claims.

According to an embodiment, a series spark gap comprising at least three partial spark gaps or air gaps is provided. In steady state conditions a supply voltage acting over the partial spark gaps is divided by first voltage dividing means. During triggering, more than half of the partial spark gaps are bypassed by using bypass means such that more than half of the supply voltage acts over the partial spark gaps that are not bypassed, whereby the partial spark gap or the partial spark gaps that are not bypassed ignite. The voltage acting over the bypassed partial spark gaps is divided asymmetrically using the bypass means whereby the bypassed partial spark gaps ignite sequentially in the order determined by the asymmetric voltage division.

BRIEF DESCRIPTION OF THE DRAWINGS

In the following the invention will be described in greater detail by means of preferred embodiments with reference to the attached drawings, in which FIG. 1 shows schematically a solution for protecting a series capacitor bank.

DETAILED DESCRIPTION OF THE INVENTION

FIG. 1 is a single line diagram of a solution for protecting a series capacitor bank. The series capacitor bank 1 is shown in FIG. 1 only schematically. Series capacitors are used to compensate for the inductance of a transmission line 2. Series capacitors will increase a transmission capacity and stability of the line 2. Series capacitors are also used to share the load between parallel lines.

The series capacitor bank 1 may be protected by a spark gap 3, for example. Further, a metal oxide varistor (MOV) 4 may be used for protecting the series capacitor bank 1. The series capacitor bank 1 may be a thyristor controlled series capacitor bank. However, for the sake of clarity such thyristor control means are not shown in FIG. 1.

FIG. 1 further shows switches K1, K2 and K3, which switches are used for bypassing the series capacitor bank 1, if needed.

The spark gap 3 comprises a first enclosure 5a and a second enclosure 5b. The first enclosure 5a may also be called a lower enclosure and the second enclosure 5b may also be called an upper enclosure.

The first enclosure 5a comprises main electrodes 6a and 6b. Correspondingly, the second enclosure 5b comprises main electrodes 6c and 6d. In connection with the main electrode 6b there is an auxiliary electrode 7a which is in the same potential as the main electrode 6b. Correspondingly there is a second auxiliary electrode 7b in connection with the main electrode 6d. The second auxiliary electrode 7b is in the same potential as the main electrode 6d.

The first enclosure 5a further comprises a middle electrode 8a. Correspondingly the second enclosure 5b comprises a middle electrode 8b. Thus the spark gap 3 is a series spark gap comprising four partial spark gaps. The first partial spark gap is between the main electrode 6a and the middle electrode 8a. The second partial spark gap is between the middle electrode 8a and the auxiliary electrode 7a. The third partial spark gap is between the main electrode 6c and the middle electrode 8b. The fourth partial spark gap is between the middle electrode 8b and the second auxiliary electrode 7b.

FIG. 1 further shows a main bushing 9a in connection with the first enclosure 5a and, correspondingly, a main bushing 9b in connection with the second enclosure 5b. FIG. 1 further shows a middle bushing 10a in connection with the first enclosure and a middle bushing 10b in connection with the second enclosure 5b.

The arrangement shown in FIG. 1 further comprises voltage divider capacitors 11a, 11b, 11c and 11d. The voltage divider capacitors 11a to 11d divide the supply voltage Ucap acting over the partial spark gaps in steady state conditions or, in other words, during continuous operation mode. The supply voltage Ucap is the voltage across the series capacitor bank 1. The arrangement further comprises auxiliary spark gaps 12a, 12b and 12c. The auxiliary spark gaps may be gas pressure spark gaps, i.e. trigatrons, for example. The first auxiliary spark gap 12a may be a trigatron that is force-triggered with a triggering pulse for igniting the first trigatron 12a. The arrangement may be provided with an ignition coil 13 for forming a triggering pulse for the second trigatron 12b. The third auxiliary spark gap 12c may be called an auxiliary trigatron.

In series with the first auxiliary spark gap there is a first current-limiting damping resistor 14a. In series with the second auxiliary spark gap 12b there is a second current-limiting damping resistor 14b and in series with the third auxiliary spark gap 12c there is a third current-limiting damping resistor 14c.

The series resistors 14a, 14b and 14c are of different sizes. In one embodiment the resistance of the first resistor 14a is lower than the resistance of the second resistor 14b and the resistance of the second resistor 14b is lower than the resistance of the third resistor 14c. In another embodiment the resistance of the second resistor 14b is 2 to 3 times higher than the resistance of the first resistor 14a and the resistance of the third resistor 14c is 2 to 3 times higher than the combined resistance of the resistors 14b and 14a. In a third embodiment the resistance of the first resistor 14a is 2 kΩ, the resistance of the second resistor 14b is 5 kΩ and the resistance of the third resistor 14c is 17.5 kΩ. The resistance of the resistors 14a to 14c may vary between 100Ω and 100 kΩ, for example. The resistance of the resistor must be high enough to limit the current through the trigatron. On the other hand, the resistance of the resistor must not be too high to ensure sufficiently fast discharge of the capacitors 11a to 11c.

In an embodiment, in steady state conditions voltage is divided equally between all partial spark gaps. Thus in that embodiment the voltage division is symmetric in steady state conditions because the voltage is divided symmetrically by the voltage divider capacitors 11a to 11d. During the triggering of the spark gap, an asymmetric voltage division is used. Thus in that embodiment symmetric and asymmetric voltage division is combined.

In the beginning of an ignition process, before triggering, the voltage over the partial spark gaps is divided symmetrically such that the voltage across each partial spark gap is ¼* Ucap if the capacitors 11a to 11d are substantially equal in size. Dimensioning the capacitors to be equal in size may provide cost efficiency. The voltage division is determined by the high impedance of the voltage divider capacitors 11a to 11d. The capacitance of the capacitors 11a to 11d may vary between 100 pF and 100000 pF, for example. In another embodiment the capacitance of the capacitors 11a to 11d may vary between 2000 pF and 40000 pF, for example. In the present embodiment the capacitance of the capacitors 11a to 11d may be 3000 pF, for example. The capacitances of the capacitors 11a to 11d must be high enough to prevent line current, which is to pass through the series capacitor bank 1, from passing through the capacitors 11a to 11d. Furthermore the reactances of the capacitors 11a to 11d must be substantially higher than the reactances of the series resistors 14a to 14c.

Next, the first auxiliary spark gap 12a is force-triggered. Thus the first auxiliary spark gap 12a is ignited by a control system command. The second auxiliary spark gap 12b is ignited by a voltage increase and ignition coil 13 current caused by the ignition of the first auxiliary spark gap 12a. The voltage Ucap acts then over the second enclosure 5b and therefore the third auxiliary spark gap 12c ignites. Because the auxiliary spark gaps 12a, 12b and 12c are ignited, the voltage divider capacitors 11a, 11b and 11c are discharged.

Thereafter the whole voltage Ucap acts across the fourth partial spark gap between middle electrode 8b and the auxiliary electrode 7b which therefore ignites the partial spark gap.

At this stage the current path runs through the fourth partial spark gap and the auxiliary spark gaps 12a, 12b and 12c. At this stage the series resistors 14a, 14b and 14c determine the voltage division between the auxiliary spark gaps 12a, 12b and 12c.

In an embodiment the voltage division ratio of the series resistors 14a, 14b and 14c is 2.5 between the resistors. This is achieved, for example, such that the resistance of the first resistor is 2 kΩ, the resistance of the second resistor is 5 kΩ and the resistance of the third resistor 14c is 17.5 kΩ. At that stage the voltage across the third partial spark gap that is between the main electrode 6c and the middle electrode 8b rises to 0.71 Ucap, which ignites the air gap.

The current path runs through the second enclosure 5b and the first auxiliary spark gap 12a and the second auxiliary spark gap 12b. The voltage across the second partial spark gap between the first auxiliary electrode 7a and the first middle electrode 8a rises to 0.71 Ucap thus igniting the partial spark gap.

Thereafter the whole voltage Ucap acts across the first partial spark gap between the first middle electrode 8a and the first main electrode 6a which ignites the partial spark gap. Thus the whole spark gap 3 is ignited and the series capacitor bank 1 is bypassed.

A voltage across a single partial spark gap before forced triggering is thus 0.25 Ucap. During the ignition process the voltage rises to 0.71 to 1 Ucap for a single partial spark gap. Thus the voltage rush across a single partial spark gap is 2.84-4 pu (per unit).

It is also possible to dimension the components such that the voltage rush across each partial spark gap during triggering is substantially equal in size. In one embodiment the components are dimensioned such that the voltage rush across one partial spark gap differs less than 10% from the voltage rush across other partial spark gaps.

In one embodiment the voltage rush across each partial spark gap is dimensioned to be substantially equal such that the capacitances of the capacitors 11a and 11d are smaller than the capacitances of the capacitors 11b and 11c. In this embodiment the resistances of the resistors 14a to 14c may correspond to the resistances in the previous embodiment. The capacitances of the capacitors 11a and 11d may be 2143 pF and the capacitances of the capacitors 11b and 11c may be 3000 pF, for example.

In a continuous operation mode the supply voltage Ucap is divided between the partial spark gaps such that voltage across the fourth partial spark gap between the middle electrode 8b and the auxiliary electrode 7b is 0.29 Ucap. The voltage across the third partial spark gap between the main electrode 6c and the middle electrode 8b is 0.21 Ucap. The voltage across the second partial spark gap between the first auxiliary electrode 7a and the first middle electrode 8a is 0.21 Ucap. The voltage across the first partial spark gap between the first middle electrode 8a and the first main electrode 6a is 0.29 Ucap.

When the third, second and first partial spark gaps are bypassed, the whole voltage Ucap acts across the fourth partial spark gap which provides a voltage rush of 3.4 pu across the fourth partial spark gap.

When the fourth partial spark gap has been ignited the voltage across the third partial spark gap rises to 0.71 Ucap, which provides a voltage rush of 3.4 pu across the third partial spark gap, thus igniting the third partial spark gap.

Thereafter the voltage across the second partial spark gap rises to 0.71 Ucap, providing a voltage rush of 3.4 pu across the second partial spark gap, thus igniting the second partial spark gap.

Thereafter the whole voltage Ucap acts across the first partial spark gap, providing a voltage rush of 3.4 pu across the first partial spark gap, thus igniting the first partial spark gap.

Thus, when the components are dimensioned such that the voltage rush across each partial spark gap is substantially equal, the minimum voltage rush across a single partial spark gap may be rather high, which improves the ignition of the spark gap. The values of the components disclosed above are only examples and it is thus possible to dimension the components case by case to fulfill the required needs.

The described solutions provide improvement in forced triggering performance also in extreme conditions. The forced triggering voltage of the spark gap can be lowered which enables to mitigate line circuit breaker transient recovery voltage. The described spark gap arrangement can be used in extreme climatic conditions because the arrangement is reliably ignited in cold conditions and self-firing of the spark gap can be avoided also in hot conditions. Lowering the forced triggering voltage also enables a high self-ignition voltage level, whereby a self-ignition in high pollution and during snow storms, for example, may be avoided. The above-described arrangement further provides a fast ignition and allows greater manufacturing tolerances.

It will be obvious to a person skilled in the art that, as the technology advances, the inventive concept can be implemented in various ways. The invention and its embodiments are not limited to the examples described above but may vary within the scope of the claims.

The series spark gap comprises at least three partial spark gaps. In the embodiment shown in FIG. 1 the series spark gap comprises four partial spark gaps. The series sparks gap may also comprise more than four partial spark gaps.

Instead of or in addition to capacitors, the first voltage dividing means for dividing the supply voltage acting over the partial spark gaps during continuous operation mode may also be coils, resistors or metal oxide varistors, for example.

Instead of or in addition to a trigatron, the bypass means arranged to bypass the partial spark gaps may also comprise other force-triggered airgaps or semiconductor components, for example.

Instead of or in addition to the series resistors, the second voltage dividing means comprised in the bypass means may also be metal oxide varistors or other non-linear or linear reactances or resistances, for example.

The invention claimed is:

1. A method for triggering a series spark gap, wherein the series spark gap includes at least three partial spark gaps in series, said method comprising the steps of:
   dividing a supply voltage acting over the partial spark gaps in a continuous operation mode by a first voltage dividing mechanism;
   bypassing more than half of the partial spark gaps during triggering using a bypass mechanism such that more than half of the supply voltage acts over the partial spark gaps that are not bypassed, whereby the partial spark gap or the partial spark gaps that are not bypassed ignite; and
   dividing during triggering the voltage acting over the bypassed partial spark gaps asymmetrically using the bypass mechanism, whereby the bypassed partial spark gaps ignite sequentially in the order determined by the asymmetric voltage division.

2. The method of claim 1, wherein in the continuous operation mode the supply voltage acting over the partial spark gaps is divided by capacitors.

3. The method of claim 1, wherein the bypass mechanism comprises a trigatron.

4. The method of claim 1, wherein the bypass mechanism comprises series resistors of different sizes for providing the asymmetric voltage division.

5. The method of claim 1, wherein in the continuous operation mode the supply voltage is divided symmetrically between the partial spark gaps.

6. The method of claim 1, wherein during triggering a voltage rush across each partial spark gap is dimensioned to be substantially equal.

7. An arrangement for triggering a series spark gap, which series spark gap comprises a main spark gap including at least three partial spark gaps in series, which arrangement comprises:
   a first voltage dividing mechanism configured to divide a supply voltage acting over the partial spark gaps of the main spark gap in a continuous operation mode; and
   a bypass mechanism arranged to bypass more than half of the partial spark gaps of the main spark gap,
   whereby the bypass mechanism comprises a second voltage dividing mechanism of different size for providing an asymmetric voltage division between the bypassed partial spark gaps.

8. The arrangement of claim 7, wherein the first voltage dividing mechanism is at least one capacitor.

9. The arrangement of claim 7, wherein the bypass mechanism comprises at least one auxiliary spark gap.

10. The arrangement of claim 7, wherein the bypass mechanism comprises series resistors of different sizes for providing the asymmetric voltage division.

11. The arrangement of claim 7, wherein a plurality of the first voltage dividing mechanisms are substantially equal in size.

12. The arrangement of claim 7, wherein the first and second voltage dividing mechanisms are dimensioned such that during triggering a voltage rush across each partial spark gap is substantially equal in size.

13. The arrangement of claim 7, wherein the bypass mechanism comprises a trigatron.

14. The arrangement of claim 13, wherein the bypass mechanism comprises series resistors of different sizes for providing the asymmetric voltage division.

15. The arrangement of claim 14, wherein the first and second voltage dividing mechanisms are dimensioned such that during triggering a voltage rush across each partial spark gap is substantially equal in size.

16. The arrangement of claim 15, wherein the first voltage dividing mechanism is at least one capacitor.

* * * * *